United States Patent

[11] 3,557,914

[72] Inventor Akira Tanaka
 Northridge, Calif.
[21] Appl. No. 798,594
[22] Filed Feb. 12, 1969
[45] Patented Jan. 26, 1971
[73] Assignee General Motors Corporation
 Detroit, Mich.
 a corporation of Delaware

[54] ELONGATED BELT RETRACTOR AND STOP MEANS
 6 Claims, 7 Drawing Figs.
[52] U.S. Cl..................................................... 188/134,
 188/82.7; 297/386
[51] Int. Cl..................................................... B60f 7/12
[50] Field of Search........................................ 188/82.3,
 .7, 134, 135; 297/386

[56] References Cited
UNITED STATES PATENTS
2,953,315 9/1960 Lautier et al. ................. 297/386X
3,288,254 11/1966 Replogle ..................... 188/82.3
3,292,744 12/1966 Replogle ..................... 188/135
3,419,308 12/1968 Apri ............................. 297/386

Primary Examiner—George E. A. Halvosa
Attorney—E. W. Christen and Herbert Furman ABSTRACT: An elongated belt-locking retractor includes a support on which is mounted a pair of elongated toothed racks and a slide which reciprocates on the support between the racks. The slide has pawls which in an extended position mate with the racks but which are normally retracted against a stop by a spring. A cam for driving the pawls into the racks is mounted to the slide for motion with or motion relative to the slide depending on the differential rate of acceleration between the cam and the slide. A belt passes around the cam and acceleration of the belt accelerates the cam as the belt moves. If the rate of acceleration is less than a predetermined rate, the cam and the slide reciprocate as a unit allowing the belt to move freely. If the rate of acceleration is greater, the cam moves relative to the slide, driving the pawls into the racks to lock the slide and thereby lock the belt.

PATENTED JAN 26 1971
3,557,914
SHEET 1 OF 2
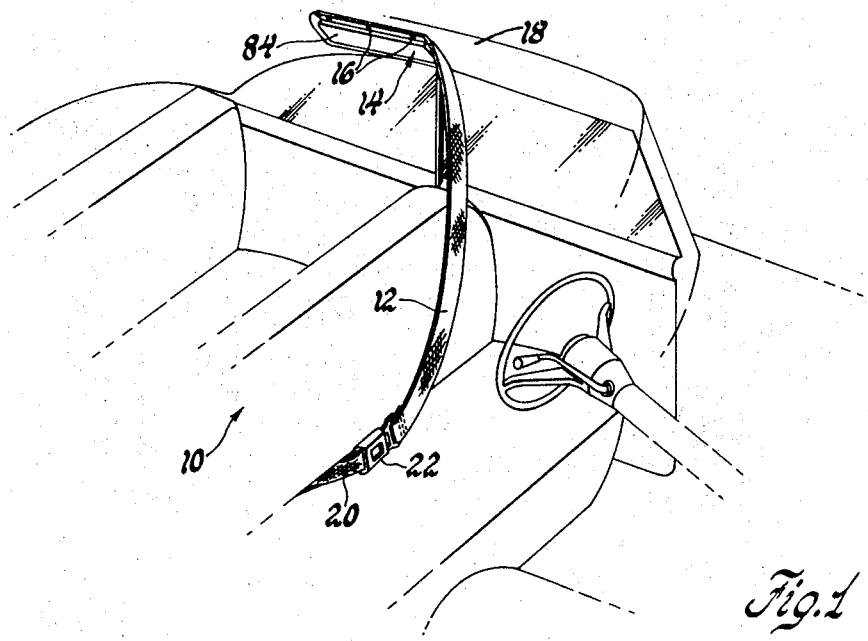
Fig.1
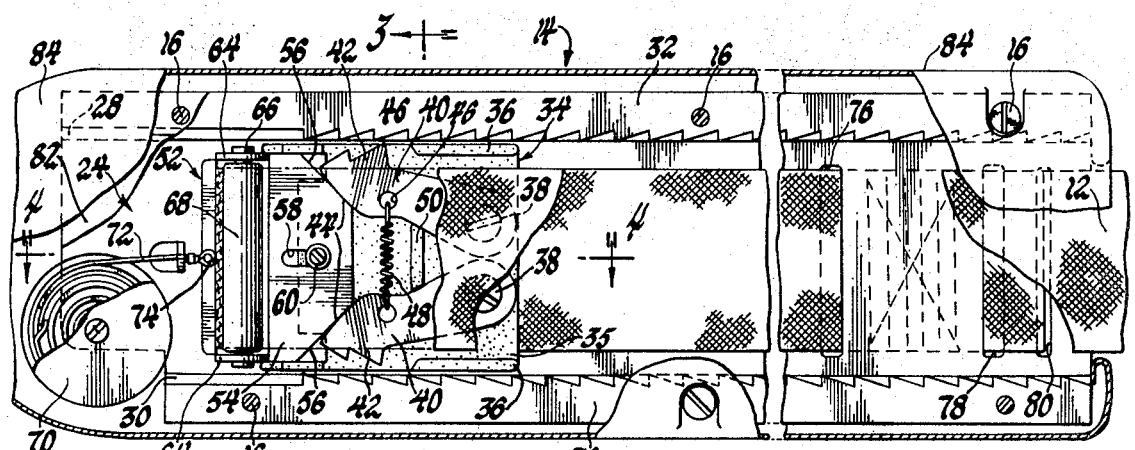
Fig.2
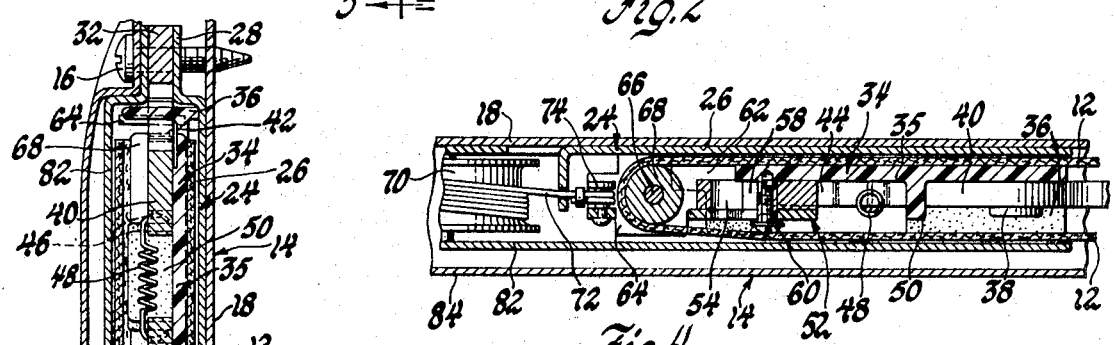
Fig.3
Fig.4
INVENTOR.
Akira Tanaka
BY
Herbert Furman
ATTORNEY INVENTOR.
Akira Tanaka
BY
Herbert Furman
ATTORNEY

ELONGATED BELT RETRACTOR AND STOP MEANS

This invention relates to a retractor for a restraint belt and more particularly to an elongated belt retractor having inertia locking. Various elongated restraint belt retractors with a locking mechanism responsive to belt acceleration have been proposed. However, these retractors rely mainly on the opposition of the force of gravity for locking action. In a vehicle, this reliance has disadvantages under the varying operating conditions.

The elongated retractor of this invention uses the acceleration of a restraint belt for camming pawls into locking engagement with toothed racks to lock the belt. The locking action is not dependent of the force of gravity and is, therefore, operable under varying conditions.

Thus, it is an object of this invention to provide an elongated retractor for a restraint belt which will operate under varying inertia and gravity forces such as those found in a vehicle. It is another object of this invention to provide an elongated retractor for a restraint belt which operates by restraint belt acceleration. It is a further object of this invention to provide an elongated retractor having locking means operated by belt acceleration. It is still another object of this invention to provide an elongated retractor having racks to which pawls operated by belt acceleration are locked. It is still a further object of this invention to provide an elongated retractor which has a plurality of racks, and pawls which simultaneously lock to their respective racks to equally distribute the locking load. It is yet a further object of this invention to provide an elongated retractor which will operate dependably and repeatedly under all conditions found in a motor vehicle.

In accomplishing these objects, the retractor generally includes a pair of racks between which a slide moves as a restraint belt is moved. The slide has a pair of movable pawls which normally do not engage their respective racks but which at a predetermined rate of belt acceleration, are driven into their respective racks by a cam to lock the slide and the belt against further movement.

These and other objects of this invention will become apparent from the following detailed description taken in conjunction with the accompanying drawings wherein:

FIG. 1 is a partial perspective view of a vehicle body having an elongated belt retractor, according to this invention, mounted in the roofside rail thereof.

FIG. 2 is an enlarged partially cutaway view of the retractor with the pawls permitting free movement of the restraint belt.

FIG. 3 is a sectional view taken substantially along the line 3-3 of FIG. 2.

FIG. 4 is a sectional view taken substantially along the line 4-4 of FIG. 2.

Figure 5:
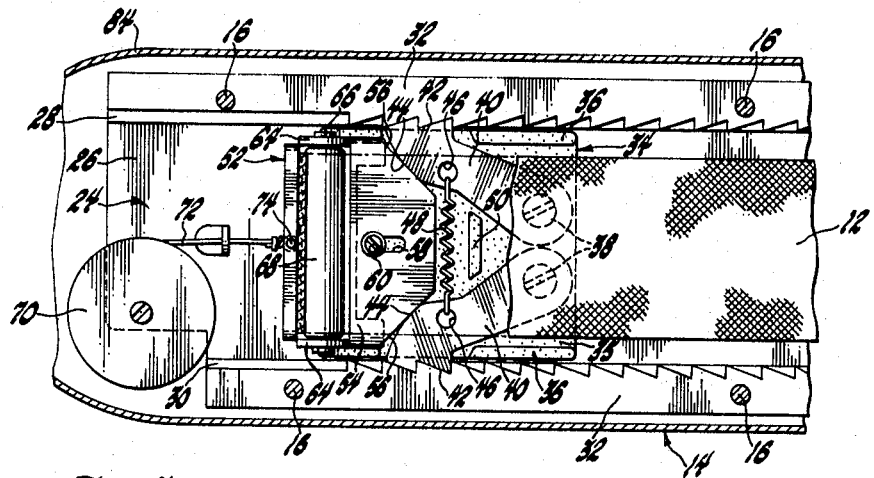
FIG. 5 is a view similar to FIG. 2 with the pawls locked to the racks preventing movement of the restraint belt.

Referring now to FIG. 1, a conventional vehicle body 10 includes a conventional shoulder belt 12 having one end attached to an elongated retractor 14 according to this invention. Retractor 14 is attached by sheet metal screws 16 to the roof side rail 18 body 10. The other end of the belt 12 is releasably attached to a mating conventional restraint belt 20, by a conventional buckle 22.

Referring now to FIGS. 2 through 6, the retractor 14 includes an elongated support 24 having a central channel 26 and two outwardly extending flanges 28 and 30 running the entire length of the support 24. Mounted to the flanges 28 and 30 by any conventional means such as the screws 16 shown in FIG. 3, are a pair of toothed longitudinal racks 32. Placed in channel 26 of support 24 for movement between the racks 32 is a slide 34 of nylon or other material which slides easily. As shown in FIG. 3, the slide 34 includes a flat plate portion 35 and two laterally extending runners 36. The runners 36 engage the sides and bottom of the channel 26 to guide the path of slide 34 along the channel without any cocking movement though there may be inertia forces on the slide 34 tending to cock the slide in the channel 26. The runners 36 also space the plate portion 35 of the slide from the bottom of channel 26 in order to permit the belt 12 to pass under the slide.

Pivotally mounted to the right-hand end of a plate portion 35 by partially threaded bolts 38 are one end of each of a pair of pawls 40. The pawls 40 each have edge teeth 42 on the other end. The teeth 42 mate squarely with the teeth of a respective rack 32 when the pawls 40 are pivoted outwardly towards the racks. On the opposite edge of the pawls 40 from the teeth 42 are camming surfaces 44 which are shaped so that any pressure against them will pivot the pawls 40 outwardly and engage teeth 42 with the teeth of the racks 32. Each of the pawls 40 has a hole 46 into which is inserted one end of a tension spring 48 to bias the pawls 40 together and into engagement with a lateral stop 50, protruding from the plate portion 35 to normally keep the teeth 42 out of engagement with the teeth of the racks 32.

A cam 52 has a right-hand flat portion 54 which si slidably seated on plate portion 35 between runners 36. Portion 54 includes cam surfaces 56 and a slot 58, of a length later to be described, centrally located between the cam surfaces. A partially threaded bolt 60 through slot 58, slidably mounts the flat portion 54 on plate portion 35, with the cam surfaces 56 nearly engaging or engaging surfaces 44 of the pawls 40 when the right-hand end of slot 58 is against bolt 60. The bolt 60 is tightened to obtain a predetermined degree of frictional engagement between the lower surface of the portion 54 of the cam 52 and the upper surface of the plate portion 35 of the slide 34. The purpose of this frictional engagement will be later described.

Figure 6:
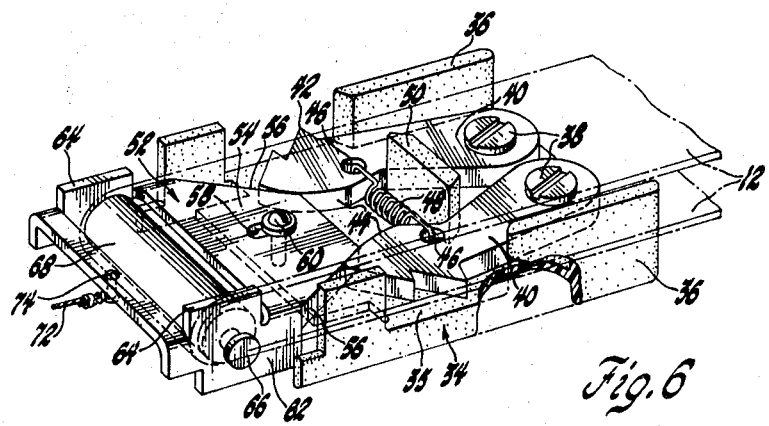
FIG. 6 is a partially cutaway perspective view showing the slide, pawl and cam.

The flat portion 54 of cam 52 also has spaced downwardly extending runners 62 at its left-hand end as best shown in FIG. 6. These runners 62 engage channel 26 and fit between the runners 36 of slide 34 to support and space the cam 52 from the channel 26 and complete the three point support of the the cam.

Also near the left-hand end of cam 52 are upwardly extending apertured supports 64 which are formed from the material of an opening in this end of the cam. Mounted between the apertured supports 64 by pin 66 is a roller 68.

A spring-driven reel 70 is rotatably mounted on support 24. A flexible wire 72 is attached at one end to the reel and wound about it, while the other end is affixed to the left-hand end of cam 52 by pin 74. The reel normally maintains the right-hand end of slot 58 against bolt 60 and biases both the cam 52 and the slide 34 towards the left as shown in FIG. 2.

The support 24 has three slots 76, 78 and 80 in the right-hand end of channel 26 as shown in FIG. 2. The one end of belt 12 is passed down through slot 76, up through slot 78, down through slot 80 and then wrapped back on itself. The one end of belt 12 is stitched to the belt behind channel 26 between slots 76 and 78 to anchor the belt to the retractor 14. The other free end of the belt extends from the slot 76 along channel 26, passes under the slide 34 and cam 52 around roller 68, and then passes over the slide 34 and cam 52 and exits from the retractor at the right-hand end thereof.

Encasing the belt 12 is cover 82. The cover 82 is of a shape similar to support 24 and is attached thereto by the screws 16. The cover 82 encloses the slide 34, cam 52 and pawls 40 as well as providing an outer guide surface for runners 36 and supports 62. The occasional engagement of the cover 82 by the runners 36 and supports 62 insures the spacing of the cam 52 and the slide 34 away from the cover 82 permitting the belt 12 to pass unrestricted therebetween. Over cover 82 is a decorative casing 84 which decoratively covers the retractor 14.

The normal position of the retractor is shown in FIG. 2. In this position the spring reel 70 maintains the right-hand end of slot 58 against bolt 60 and spring 48 holds the pawls 40 against stop 50 to locate the teeth 42 out of engagement with the rack teeth. With the teeth 42 out of engagement with the rack teeth, the slide 34 and the cam 52 are free to move along the racks 32 except for the biasing force of spring reel 70.

When the belt 12 is pulled out of the retractor, the rate of acceleration of the belt is transferred to the cam 52.

It will be remembered that the surfaces 56 of cam 52 are nearly engaging or engaging surfaces 44 of pawls 40. If the surfaces 56 are nearly engaging surfaces 44, and the rate of acceleration of the belt 12 is very low, the inertia of the slide 34 is insufficient to overcome the friction between the engaging surfaces of the cam 52 and the slide 34, so that the cam 52 and the side 34 accelerate together with no relative motion. If the acceleration of the belt 12 is higher but not higher than a predetermined rate, then the inertia of the slide 34 is sufficient to overcome the friction, and the cam 52 will move to the right relative to the slide 34 until the surfaces of the cam 52 and the slide 34 engage. However, this acceleration of the belt will not be high enough to overcome the tension of spring 48 holding the pawls 40 from being wedged apart by cam surfaces 56 and this tension will prevent further relative motion between the cam 52 and the slide 34. If the surfaces 56 of cam 52 engage surfaces 44 of the pawls 40, then the friction between the engaging surface of the cam 52 and the slide 34 and the tension of the spring 48 acting through pawls 40 will combine to prevent relative motion between the cam 52 and the slide 34, as the belt 12 accelerates below a predetermined rate.

Without this relative motion, the pawls 40 remain against the stop 50 out of engagement with the rack 32 as shown in FIG. 2 and both the cam 52 and the slide 34 reciprocate within the retractor 14 as the belt 12 moves against the pull of the spring reel 70. When the belt 12 is released, the spring reel 70 will draw the belt back into the retractor 14 and return the cam 52 and the slide 34 to the position shown in FIG. 2.

When the belt 12 is pulled out of the retractor above a predetermined rate of acceleration, a different reaction is obtained between the cam 52, the slide 34 and the pawls 40. The rapid acceleration of the belt 12 is applied to the cam 52 which moves to the right. The slide 34 also begins to move to the right but because of its inertia will not accelerate as rapidly. The difference in the rate of acceleration of the slide 34 and the cam 52 moves the cam 52 to the right relative to the slide 34 against the friction between the engaging surfaces of cam 52 and slide 34 and against the tension of spring 48 holding the pawls 40 from being wedged apart by the cam surfaces 56 as before explained. However, now the differential rate of acceleration is sufficient to overcome resisting forces of friction and spring tension and relative movement between the cam 52 and the slide 34 begins with the cam surfaces 56 acting on pawl surfaces 44 to wedge the pawls 40 apart to a position where pawl teeth 42 catch with the teeth of rack 32. As the teeth 42 catch the rack teeth, they stop the slide 34 from further movement to the right, while for a short time thereafter, the cam 52 continues to move to the right, wedging the teeth 42 further into the racks 32 until they are completely engaged therein. When the teeth are fully engaged in the rack, the outward wedging action of cam surfaces 56 on pawl surfaces 42, becomes an inward locking action of pawl surfaces 42 to cam surfaces 56 as the pawls 40 can no longer spread. The slot 58 is of such a length that the pin 60 will not engage the left end of the slot 58 until the pawls 40 have been wedged apart further than the racks 32 will permit, insuring that the load of stopping the cam is on the pawls 40 rather than on pin 60. The wedging action, once the pawls 40 have engaged the rack 32, continues whether the cam 52 is accelerating or decelerating just as long as it moves to the left. Thus, as shown in FIG. 5, the slide 34 is locked to the rack 32 and the cam 52 is stopped in turn stopping the belt 12 from further movement out of the retractor 14.

This locking action holds the belt 12 against movement until the force on the belt 12 is released, allowing the reel 70 to move cam 52 to the left, to the position shown in FIG. 2, enabling the spring 48 to unlock the pawls 40 from the racks. After the pawls are returned to the position in FIG. 2, the slide 34 and the belt 12 are again free to move as described before.

As previously explained, the cm cam 52 and the slide 2 34 will move as a unit if the belt 12 is slowly pulled out of the retractor and the cam 52 will move relative to the slide 34 driving the pawls 40 into the racks 32 if the belt is pulled out of the retractor above a predetermined rate of acceleration. The point at which the rate of acceleration of the belt 12 causes the relative movement, rather than the unit movement, is variable but dependent on such factors as the friction between the cam 52 and the slide 34, the friction between their respective runners 62 and 36 and the channel 26 and cover 82, the angle of engagement of the cam surfaces 56 and the camming surfaces 44 and the tension of spring 48. In any particular design, the variables of friction and engagement angle are fixed so that to vary the point of change from unit movement of relative movement, the tension of spring 48 must be varied. In order to obtain a retractor which will slide up to a desired limit of acceleration rate and lock at an acceleration rate greater than the desired limit, the spring rate of spring 48 must be adjusted. This adjustment may be either by calculation or trial and error to obtain the proper combination of the friction, cam angle and spring rate which produces the desired limit of acceleration to change from sliding to locking of belt 12.

Figure 7:
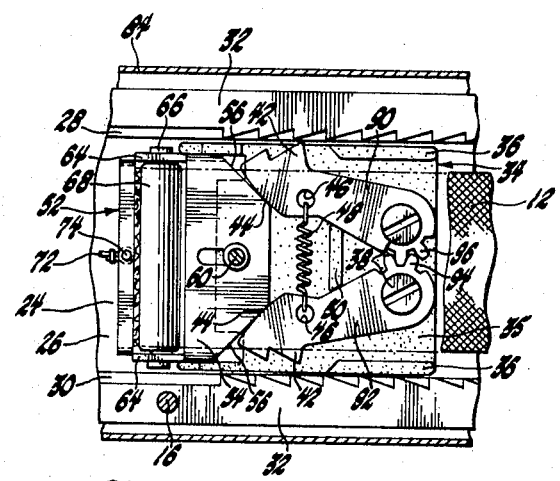
FIG. 7 is a partially cutaway view of another embodiment of this invention.

Referring now to FIG. 7, a second embodiment of this invention is shown. This embodiment differs from the previous embodiment only in the pawls 90 and 92 which have meshing gear teeth 94 and 96. Teeth 94 and 96 insure that any movement of one pawl results in simultaneous movement of the other pawl into or out of engagement with a respective rack 32. The teeth 94 and 96 thus insure a more evenly distributed locking force between the pawls 90 and 92.

Although various forms of this invention have been described in detail, it will appear obvious to those skilled in the art that various other modifications may be made without departing from the scope of this invention.

I claim:

1. An elongated retractor for a restraint belt comprising a support, elongated rack means secured to the support, a slide, means mounting the slide on the support for reciprocal movement relative to the rack means, pawl means pivotally mounted to the slide for reciprocal movement therewith relative to the rack means and pivotal movement relative thereto into engagement with the rack means to releasably secure the slide to the rack means, biasing means normally holding the pawl means out of engagement with the rack means, cam means mounted on the slide for movement therewith and reciprocal movement relative thereto into engagement with the pawl means to move the pawl means into engagement with the rack means against the action of the holding means, relative movement control means for controlling said cam means and said slide to move as a unit on application of an acceleration to the cam means below a predetermined limit and also to permit said cam means to move relative to said slide on application of an acceleration to the cam means greater than said predetermined limit, and means for applying acceleration from a restraint belt to the cam means.

2. An elongated retractor for a restraint belt comprising a support, a pair of spaced elongated racks mounted to the support, a slide, means mounting the slide on the support for reciprocal movement relative to the racks, a pair of pawls pivoted to the slide for reciprocal movement therewith relative to the racks and pivotal movement relative thereto into engagement with a respective rack to releasably secure the slide to the racks, holding means normally holding the pawls out of engagement with the racks, cam means mounted to the slide for movement therewith and reciprocal movement relative thereto into engagement with the pawls to move the pawls into engagement with the racks against the action of the holding means, friction means for providing a frictional connection between said cam means and said slide to move said cam means and said slide as a unit on application of an acceleration to the cam means below a predetermined limit and also to permit said cam means to move relative to the slide on application of an acceleration greater than the predetermined limit, and means for applying acceleration from a restraint belt to the cam means.

3. A retractor as recited in claim 2 wherein gear means interconnect the pawls for movement of the other pawl upon movement of one pawl.

4. A retractor as recited in claim 2 wherein the cam means wedges the pawls oppositely into their respective racks.

5. An elongated retractor for a restraint belt comprising a support, a pair of elongated racks mounted to the support in a spaced relationship, a slide including a flat portion and runners engaging the support for reciprocal movement relative to the racks and for spacing the flat portion of the slide from the support, a pair of pawls pivotally mounted to the flat portion for reciprocal movement with the slide and swinging movement thereto into engagement with the respective rack to releasably secure the slide to the rack, spring means mounted between the pawls normally holding the pawls out of engagement with the rack, stop means mounted to the slide for positioning the pawls on the flat portion, a cam frictionally engaging the flat portion of the slide for causing movement therewith and also for permitting reciprocal movement relative thereto into engagement with the pawls to move the pawls into the racks against the action of the spring means, clamp means for clamping said cam and said slide to control the frictional engagement therebetween to move the cam and the slide as a unit upon the application of an acceleration to the cam below a predetermined limit and also to permit said cam to slide on the slide upon application of an acceleration greater than the predetermined limit to pivot the pawls, and means applying acceleration of the restraint belt to the cam means, said restraint belt passing under the slide, around the cam means and over the slide.

6. A retractor as recited in claim 5 wherein the clamp means comprises a slot in the cam fastening means through the slot clamping the cam to the slide, the slot being sufficiently long to allow the cam to move the pawls into engagement with their respective racks before the fastening means engages the end of the slot whereby the load of stopping the cam is taken by the pawls rather than by the fastening means.